(12) United States Patent
Concannon

(10) Patent No.: US 9,000,709 B2
(45) Date of Patent: Apr. 7, 2015

(54) SYSTEM AND METHOD FOR CONTROL AND ANALYSIS OF A PRIME MOVER IN AN ELECTRICAL MACHINE USING CALCULATED TORQUE

(75) Inventor: Brian T. Concannon, Evansville, IN (US)

(73) Assignee: Electro-Motive Diesel, Inc., LeGrange, IL (US)

( * ) Notice: Subject to any disclaimer, the term of this patent is extended or adjusted under 35 U.S.C. 154(b) by 289 days.

(21) Appl. No.: 13/612,209

(22) Filed: Sep. 12, 2012

(65) Prior Publication Data

US 2014/0070753 A1    Mar. 13, 2014

(51) Int. Cl.
    G05B 11/01    (2006.01)
    G01M 15/04    (2006.01)

(52) U.S. Cl.
    CPC ............. *G01M 15/04* (2013.01); *G05B 11/01* (2013.01)

(58) Field of Classification Search
    USPC ......... 318/140, 147, 151, 153, 563, 565, 567, 318/604, 652, 671, 712, 717, 719; 290/31, 290/32, 34, 36 R, 40 C, 45, 46, 47, 51
    See application file for complete search history.

(56) References Cited

U.S. PATENT DOCUMENTS

| | | | |
|---|---|---|---|
| 3,902,073 A | | 8/1975 | Lafuze |
| 4,295,363 A | * | 10/1981 | Buck et al. ................ 73/114.03 |
| 4,616,166 A | * | 10/1986 | Cooper et al. ................ 318/712 |
| 4,862,009 A | | 8/1989 | King |
| 5,041,980 A | * | 8/1991 | Maddock et al. ............. 701/101 |
| 5,488,286 A | | 1/1996 | Rozman et al. |
| 6,073,713 A | | 6/2000 | Brandenburg et al. |
| 6,373,144 B2 | * | 4/2002 | Frohlich et al. ............. 290/40 R |
| 6,750,626 B2 | | 6/2004 | Leonardi et al. |
| 7,227,271 B2 | * | 6/2007 | Anghel et al. ................... 290/31 |
| 8,037,858 B2 | | 10/2011 | Seufert et al. |
| 8,097,968 B2 | * | 1/2012 | Anghel et al. ................... 290/31 |
| 2010/0251984 A1 | | 10/2010 | Bouchon et al. |

\* cited by examiner

*Primary Examiner* — Bentsu Ro
*Assistant Examiner* — Thai Dinh
(74) *Attorney, Agent, or Firm* — Finnegan, Henderson, Farabow, Garrett & Dunner, LLP

(57) ABSTRACT

Apparatus for controlling and diagnosing a prime mover of a vehicle traction system includes an alternator having a rotor and coupled to a crankshaft of the prime mover, a source of electrical energy, a position sensor supplying a position signal representative of an angular position of the rotor, and a control computer. The computer supplies energy to the alternator to crank the prime mover at a controlled rate. In a diagnosis mode, the computer generates a condition signal indicative of a malfunction of the prime mover, from a compression signal derived from an acceleration signal which is derived from the position signal. In a barring-over mode, the computer also supplies energy to the alternator and monitors the position signal to place the crankshaft in a desired angular position in an operation separate from diagnosis mode.

4 Claims, 5 Drawing Sheets

SYSTEM AND METHOD FOR CONTROL AND ANALYSIS OF A PRIME MOVER IN AN ELECTRICAL MACHINE USING CALCULATED TORQUE

TECHNICAL FIELD

The present disclosure relates generally to an electrical machine having a prime mover and an electric transmission. More particularly, the disclosure relates to a system and method for controlling and analyzing the condition of the prime mover.

BACKGROUND

Electrical transmissions are often used in applications such as locomotives or other large self-propelled traction vehicles. An example is described in U.S. Pat. No. 4,616,166.

Such a vehicle, in practice, will sometimes be out of service for maintenance. During maintenance, it is often necessary to position the crankshaft of a prime mover, such as a diesel engine, at a specific position, e.g., such that a piston in a specified cylinder is at top or bottom dead center. Usually, this operation is performed by using a long metal bar as a lever to manually rotate a ring gear attached to the crankshaft, an operation known as "barring," or by otherwise engaging a flywheel coupled to crankshaft 23 (FIG. 1) to move the crankshaft. For example, a barring rig consisting of a pinion gear and an air motor may be coupled to a ring gear of the engine, Then, measured amounts of air pressure are supplied to the rig to slowly rotate the engine until the crankshaft, in the operator's estimation, is at the desired position. Although it is known in the art to employ the electrical machine as a cranking motor to start the engine, such cranking operation cannot be performed with sufficient precision to replace a barring operation. It is therefore desirable to provide improved apparatus and methods for precisely positioning the crankshaft.

When the engine exhibits reduced performance, diagnostic procedures, such as cylinder compression measurements are performed. Such measurements also require extensive manual operations. Thus, it is also desirable to provide improved apparatus and methods for diagnosis and determination of causes of performance degradation in the engine.

SUMMARY

In one aspect, the present disclosure is directed to a method for analyzing the condition of a prime mover coupled to a rotor of an electrical machine. The method may include inhibiting injection of fuel into the prime mover and cranking the prime mover at a controlled rate by supplying current to the machine. The method may further include generating a position signal representing an angular position of the rotor; generating an acceleration signal representing the angular acceleration of the rotor, based on the position signal; and generating a compression signal representing compression of cylinders of the prime mover, based on the acceleration signal. The method may further include comparing values of the compression signal to a predetermined compression reference signal and generating an indication of a malfunction in the cylinders, based on the comparison.

In another aspect, the present disclosure is directed to apparatus for analyzing the condition of a prime mover in a vehicle traction system. The apparatus may include electrical machine for supplying electrical energy to a traction system when the electrical machine is driven by the prime mover, the electrical machine comprising a rotor coupled to a crankshaft of the prime mover; and a sensor generating a position signal representing an angular position of the rotor. The apparatus may further include a processor; and a memory storing instructions. When the processor executes the instructions, the processor may cause the apparatus to inhibit injection of fuel into the prime mover, crank the prime mover at a controlled rate by supplying current from the current source to the electrical machine, and generate a position signal representing an angular position of the rotor. The processor may further cause the apparatus to generate an acceleration signal representing the angular acceleration of the rotor, based on the position signal; generate a compression signal representing compression of cylinders of the prime mover, based on the acceleration signal; and compare values of the compression signal to a predetermined compression reference signal. Finally, the processor may cause the apparatus to generate an indication of a malfunction in the cylinders, based on the comparison.

In a further aspect, the present disclosure is directed to a method for placing a crankshaft of a prime mover in a desired angular position, the crankshaft being coupled to a rotor of an electrical machine, the electrical machine having a field coil and a plurality of stator phase coils. The method may include determining an initial position of a rotor of the electrical machine with no current flowing, determining the direction of the torque to be produced on the rotor when the rotor is rotated from the initial position to a displacement position corresponding to the desired crankshaft position, and increasing current in the field coil to an initial value. The method may further include receiving a value of torque required to begin rotation of the electrical machine, calculating the amplitudes of phase currents in the stator phase coils required to produce the received torque value, and supplying the calculated phase currents to the stator phase coils, such that a phase direct axis of the stator phase coils is aligned with the initial rotor position. Finally, the method may include modifying the amplitudes of phase currents in the stator phase coils so as to rotate the phase direct axis toward the displacement position, generating a signal representing the angular position of the rotor, and ceasing supply of current to the stator phase coils when the position signal indicates that the rotor is in the displacement position.

In yet another aspect, the present disclosure is directed to apparatus for placing a crankshaft of a prime mover of a vehicle traction system in a desired angular position. The apparatus may include an alternator for supplying electrical energy to the traction system when driven by the prime mover, the alternator including a rotor coupled to a crankshaft of the prime mover, a field coil on the rotor, and a plurality of stator phase coils. The apparatus may also include a sensor generating a position signal representing an angular position of the rotor, a processor, and a memory storing instructions. When the processor executes the instructions, the processor may cause the apparatus to determine an initial position of a rotor of the alternator with no current flowing in the field coil or the stator phase coils, based on the position signal; determine a direction of torque to be produced on the rotor when the rotor is rotated from the initial position to a displacement position corresponding to the desired position; increase current in the field coil to an initial value; and receive a value of torque required to begin rotation of the alternator and the crankshaft. The processor may further cause the apparatus to calculate the amplitudes of phase currents in the stator phase coils required to produce the received torque value; supply the calculated phase currents to the stator phase coils, such that a phase direct axis of the stator phase coils is aligned with the initial rotor position; modify the amplitudes of phase currents in the stator phase coils so as to rotate the phase direct axis toward the displacement position; and cease supplying current to the stator phase coils when the position signal indicates that the rotor is in the displacement position.

DETAILED DESCRIPTION

Reference will now be made in detail to exemplary embodiments of the invention, examples of which are illustrated in the accompanying drawings. Wherever possible, the same reference numbers will be used throughout the drawings to refer to the same or like parts.

Figure 1:
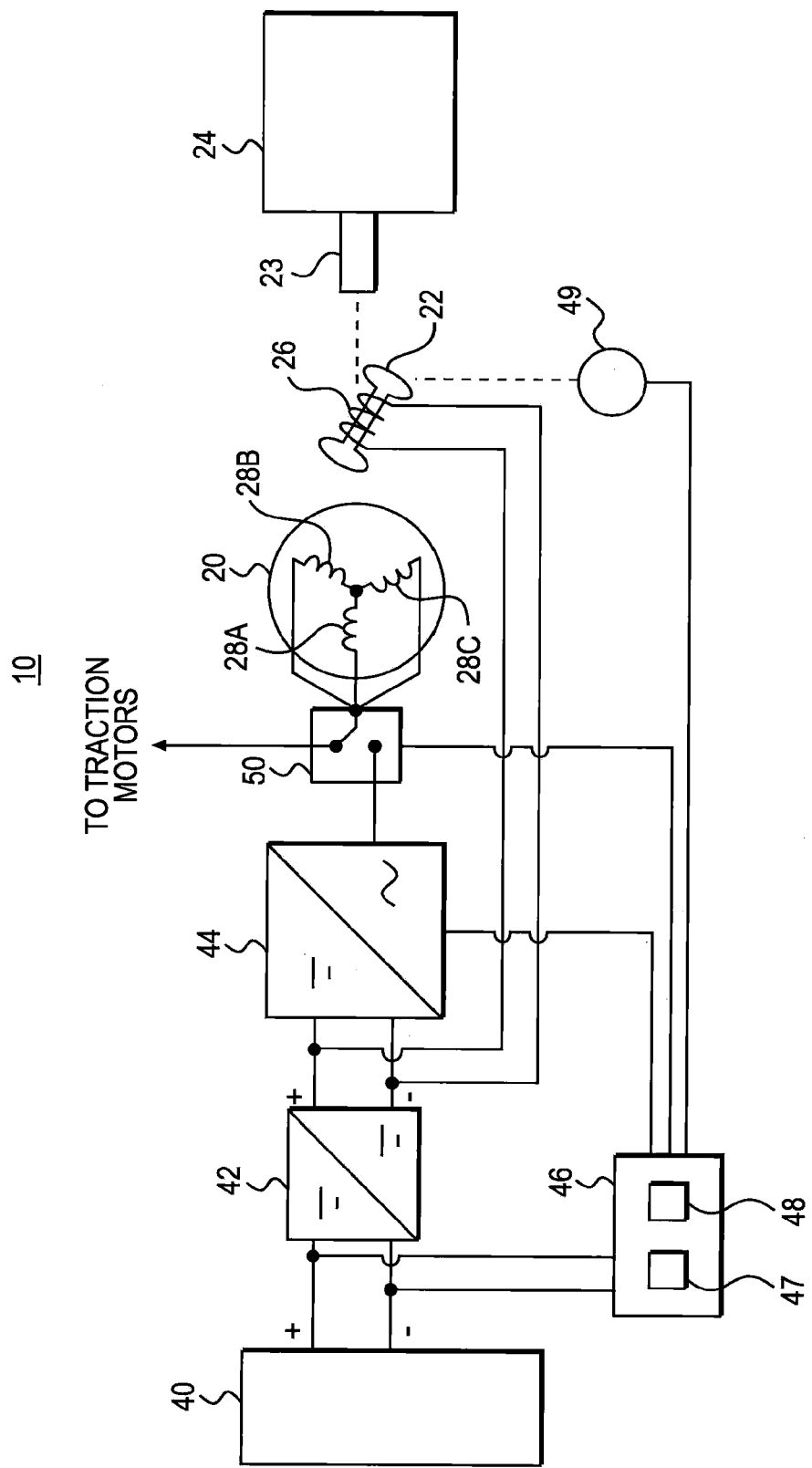
FIG. 1 is a schematic illustration of an exemplary system consistent with the disclosed embodiments.

FIG. 1 shows components of an exemplary transmission system 10 of a vehicle, including, e.g., an alternator 20, for supplying electric energy to a plurality of alternating current (AC) traction motors (not shown) coupled through speed-reducing gearing to respective axle-wheel sets of the vehicle. Alternator 20 includes a rotor 22 mechanically coupled to a crankshaft 23 of a prime mover, such as a diesel internal combustion engine 24, on board the vehicle. When engine 24 rotates rotor 22 while excitation current is supplied to a field coil 28C. The alternating voltage output of stator coils 28A, 28B, 28C is supplied to the armature coils of the traction motors. The output power of alternator 20 is regulated or varied by suitably controlling the strength of the excitation of field coil 26 and the rotational speed of engine 24.

Referring again to FIG. 1, in an embodiment consistent with the invention, an electrical machine, such as a three-phase synchronous alternator 20 is used as a cranking motor for engine 24. System 10 may be implemented in, for example, a SD70ACe locomotive commercially available from Electro-Motive Diesel, Inc. of LaGrange, Ill.

Cranking energy in system 10 is provided by a battery 40. A boost converter 42 may be employed to increase the battery voltage from, for example, 32 or 64 volts DC to 128 volts DC. Boost converter 42 may be connected to a three-phase inverter 44. Alternator 20 may be of the wound field type, and includes field coil 26, also powered from the battery 40 via converter 42. System control is provided by a control computer 46, including a processor 47 and a computer-readable storage medium, such as a memory 48.

System 10 also includes a position sensor 49 which generates a signal indicating the angular position of rotor 22. Sensor 49 may be of a type commercially available from Baumer Ltd. of Southington, Conn. A switching circuit 50 is provided to switch alternator 20 between operation in a cranking motor mode and a propulsion mode, in which motive power is provided to traction motors, not shown.

Figure 2:
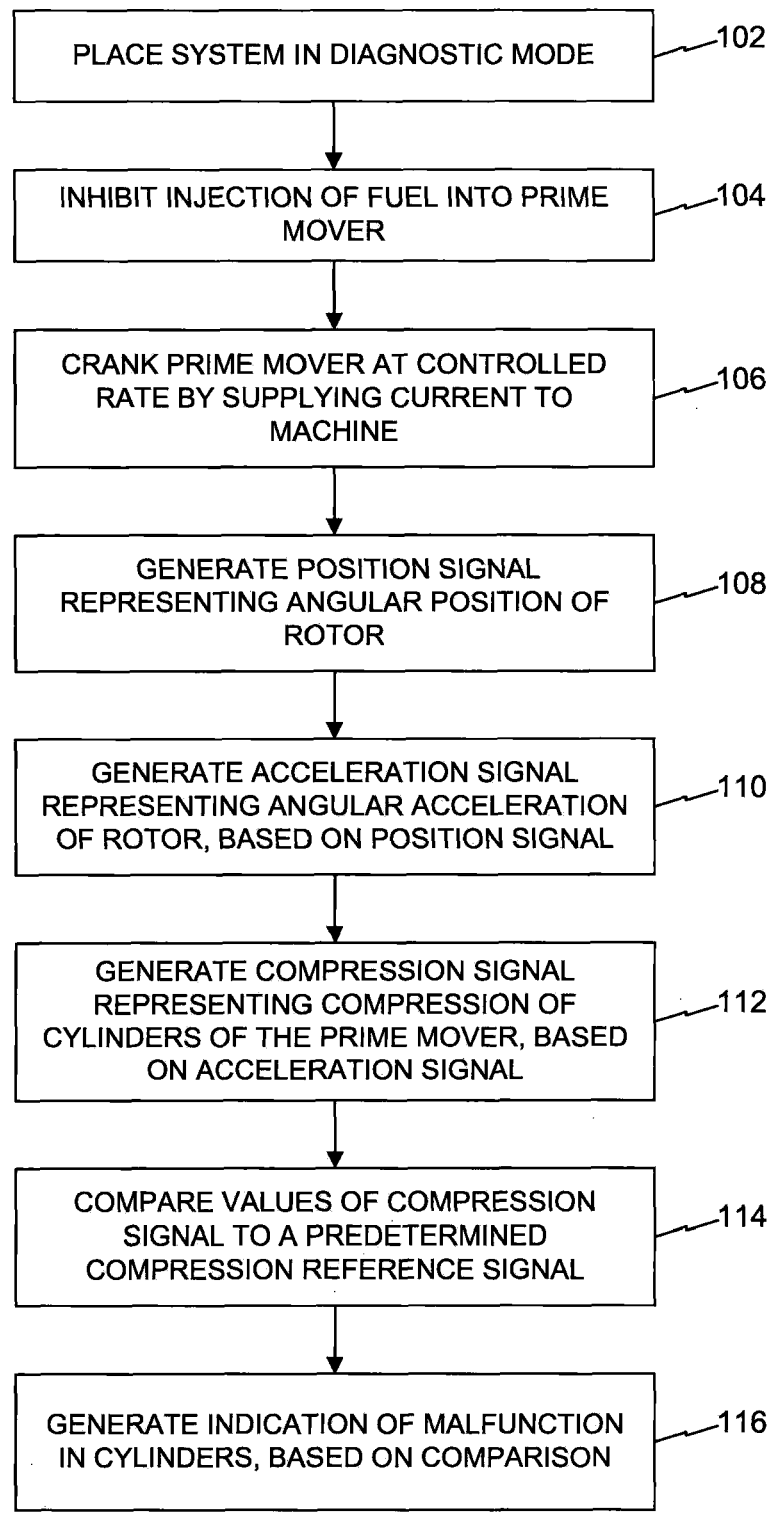
FIG. 2 is a flowchart of a method for analyzing the condition of a prime mover in the system of FIG. 1.

FIG. 2 shows a method 100 using system 10 to analyze operation of engine 24. Method 100 may be performed by processor 47 executing instructions of a software program stored in memory 48. Specifically, low compression in one or more cylinders of engine 24 can be detected, based on cranking torque patterns, polar inertia, and assumed engine friction characteristics. First, at 102, control computer 46 responds to a user command to place system 10 in a diagnostic mode. At 104, fuel injection to engine 24 is inhibited. Constant frequency AC current is then supplied at 106 to stator coils 28A, 28B, 28C to crank engine 24 and control the rate of rotation thereof to a specific range, for example 40 RPM while generating a position signal from sensor 49 at 108. At 110, control computer then generates an acceleration signal corresponding to angular acceleration of rotor 22 of alternator 20, calculated as the second time derivative of the position signal. The acceleration signal is a somewhat sinusoidal pattern. At 112, a cylinder compression signal is then computed from the acceleration signal, based on the well-known slider-crank equation; specifically, $x = R \cos(\Theta) + L \cos(\phi)$, where x is displacement of a piston from top dead center, R is the length of the crank arm, L is the length of the piston arm, $\Theta$ is the angle between the crank arm and the direction of travel of the piston, and $\phi$ is the angle between the piston arm and the direction of travel of the piston.

Values of the compression signal are compared by computer 46 at 114 to predetermined compression reference values. If the compression signal values are lower than the reference values in areas where certain cylinder pressures are dominant, then computer 46 generates an indication at 116 of a malfunction in one or more of those certain cylinders of engine 24.

On occasion, engine mechanics may need to turn engine 24 to a specified crankshaft angle, or to place a specified cylinder to top or bottom dead center for inspection. Consistent with disclosed embodiments, engine turning is provided by first sensing the angular position of rotor 22 (and crankshaft 23) and generating a position signal using position sensor 49. The position signal is supplied to control computer 46, along with operator input specifying a desired position of engine 24. Processor 46 then executes instructions in memory 48 to generate control signals to cause alternator 20 to rotate engine 24 to the desired position, at a very slow rate, for example, 10 rpm.

The method for computing torque in control computer 46 may employ torque calculation algorithms residing in power mode and braking mode software of control computer 46. This software may be invoked simply be specifying the desired low speed required while the engine is rotated to the desired position.

Figure 3:
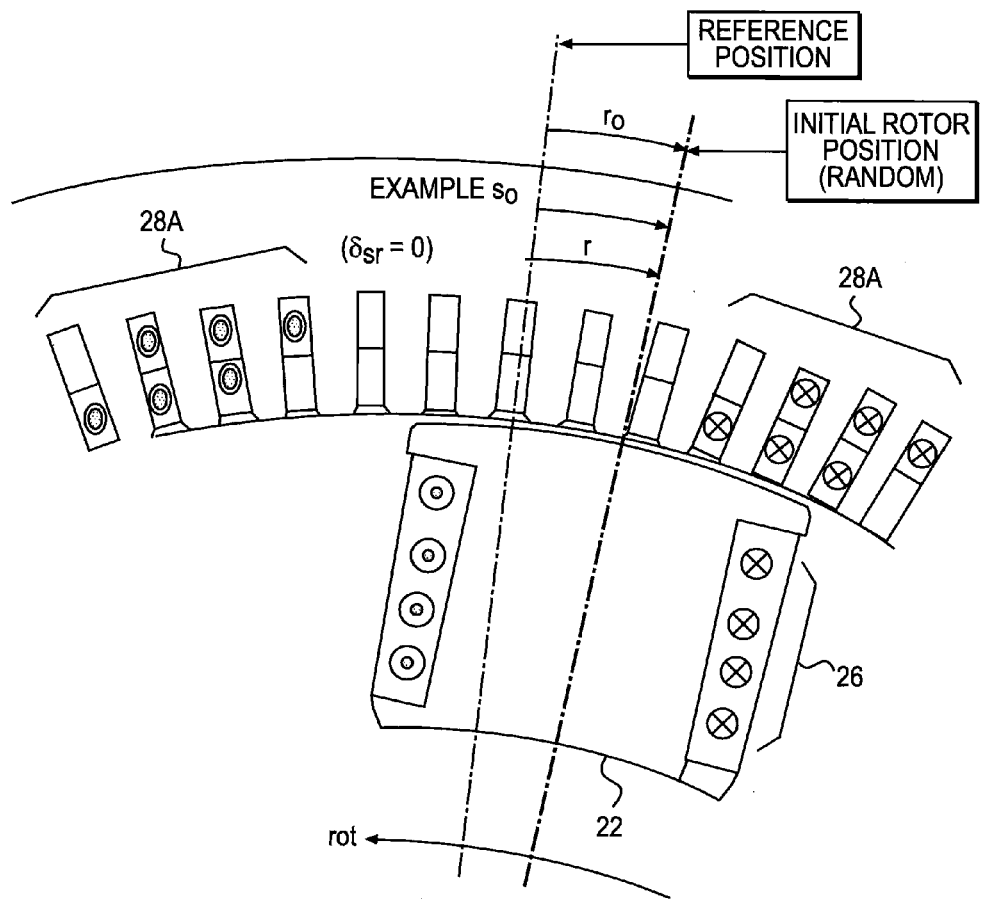
FIG. 3 is a schematic illustration of a portion of a rotor and stator of a main synchronous electrical machine of the system of FIG. 1, with the rotor in an initial position.

Cranking torque when alternator 20 is used as a cranking motor can be calculated by ascertaining the position of rotor 22 with respect to a stator magnetic axis. FIG. 3 is a schematic diagram of a portion of an exemplary alternator 20 having ten poles. However the invention is not limited to a ten-pole configuration. Parameters of the torque calculation may include the DC field current $I_{fd}$ of alternator 20, and the instantaneous stator coil currents $i_a$, $i_b$, and $i_c$ of alternator 20.

The radial centerline of the phase a stator coil, within a two-pole span, will be referred to as the phase a direct axis, or the reference position. Positive current in the stator coil of phase a alone causes a magnetic south pole in the area embraced by coil 28A, and will cause a local maximum air gap flux density near the geometric center of the embraced teeth and slots of the structure supporting stator phase coil 28A of phase a. The position of rotor 22, also called the rotor magnetic axis, is defined by the angle r of the centerline of one of the north poles of rotor 22, with respect to the reference position, within a two-pole span. The reference position may also be referred to as the rotor direct axis.

As an example, assume that engine 24 has stopped the cranking motor at a random position r=r$_o$, in FIG. 3. Alternator 20 is thus at zero rpm. The position r of rotor 22 can be determined at any time by reading the output of sensor 49 and adding a calibration offset to it. For example, r may have a value such as "35 degrees," which means that the maximum air gap flux density, which is caused by the field current acting alone, is located 35 electrical degrees (7 mechanical degrees) counterclockwise from the reference position.

The characteristics of the position signal supplied by sensor 49 varies from one manufacturer to another, and many signal options are available. To convert the position sensor signal reading to the rotor position within a two-pole span, a transformation formula, dependent upon the characteristics of the output signal generated by sensor 49, may be employed. An initial position sensor output correlation with a rotor direct axis position may be performed at the time of installation of sensor 49.

The stator magnetic axis is referred to as the angular location S, within a two-pole span and with respect to the reference position. This is where the flux density caused by the combined currents of all stator phase coils is at its maximum south value. By varying the three instantaneous phase currents i$_a$, i$_b$, and i$_c$, the sum of individual air gap fields generated by the phase currents can be made to have its maximum south polarity value at any desired angular position S within a two-pole span. This is accomplished by having computer 46 generate phase currents i$_a$, i$_b$, and i$_c$ according to:

$$l_a = i_{amax} \cos(s)$$

$$l_b = i_{amax} \cos(s - 2\pi/3)$$

$$l_b = i_{amax} \cos(s 4\pi/3) \quad (1)$$

To illustrate, if S of the stator is to be aligned perfectly with the reference position, S is zero degrees and (1) yields $l_a = i_{amax}$, $l_b = l_c = -i_{amax}/2$. Initially, at 0 rpm, S can be held equal to r$_o$, that is, at the initial rotor position, while $l_a$ and $l_{fld}$ are being increased from zero. As illustrated in FIG. 3, the stator magnetic axis at that time, S$_0$, is aligned with the rotor position r. No torque results because the stator and rotor fields are aligned.

Once $l_a$ and $l_{fld}$ are at their steady state values, computer 46 can increase the supply frequency ω of $l_a$ from zero. Flux is generated in the air gap, torque is applied to rotor 22, and rotor 22 begins to rotate. After some rotation, the resulting stator magnetic axis S has traveled through an angle of ∫ω dt and the stator magnetic axis moves to S=∫ω dt+r$_o$.

Figure 4:
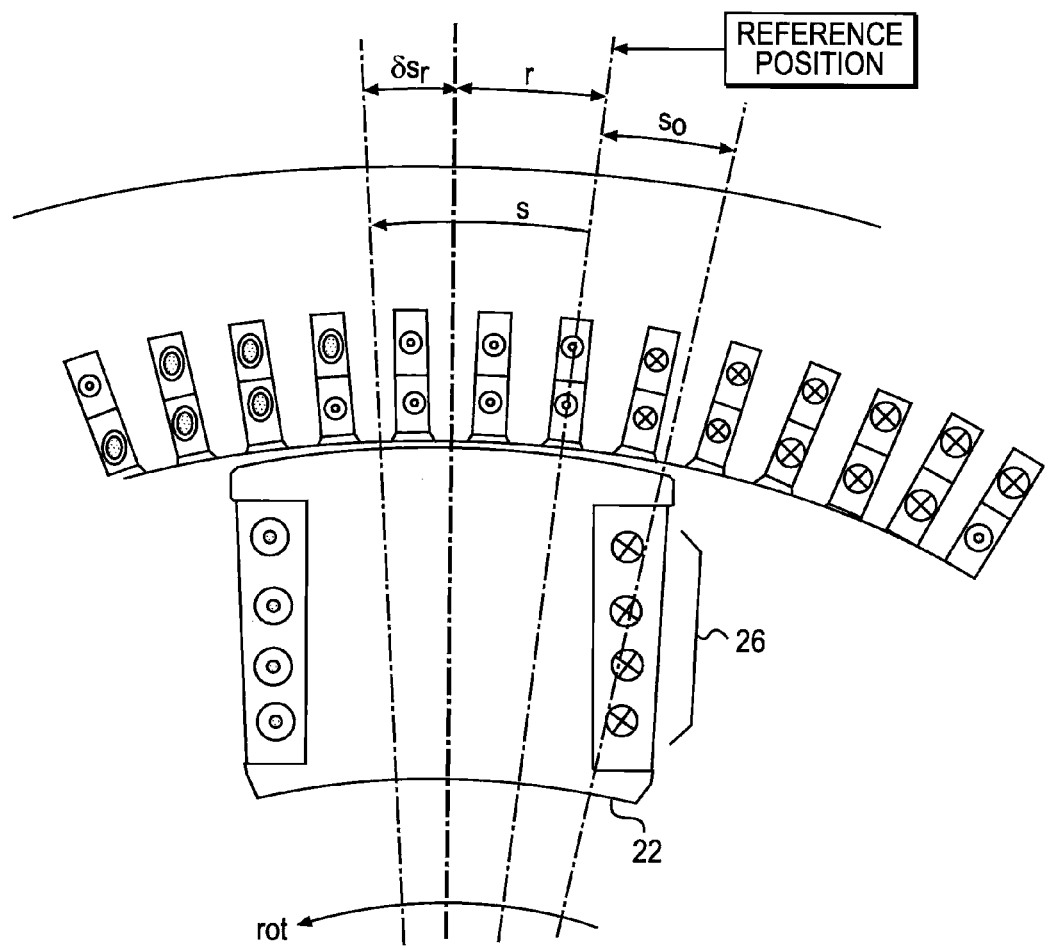
FIG. 4 is a schematic illustration of the portion of the rotor and stator of FIG. 2, with the rotor in desired displaced position.

FIG. 4 illustrates the relative angular position of the stator magnetic axis S and the rotor position r at some later moment in time. The relative position angle δ$_{sr}$ is defined as: δ$_{sr}$=s−r. Computer 46 can subtract 360 degrees from S after every electrical cycle to avoid an overflow condition, provided that r is also adjusted. The cranking motor air gap torque T is an approximate function of δ$_{sr}$, $l_a$, and $l_{fld}$, specifically, T=K$l_a l_{fld}$ sin(δ$_{sr}$), where K is a cranking motor machine constant. An alternate to this equation could include an adjustment for the effects of rotor saliency.

Industrial Applicability

Figure 5:
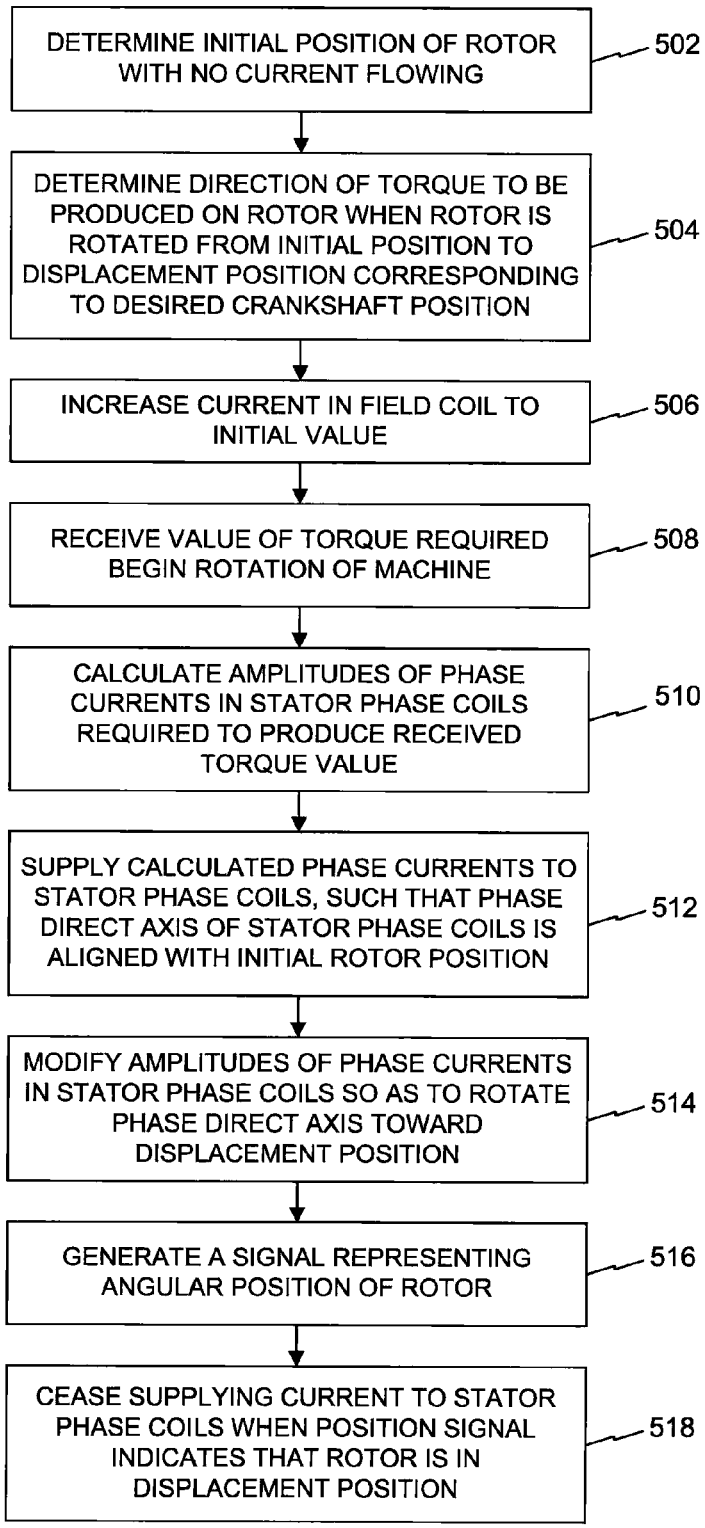
FIG. 5 is a flowchart of a method for placing a crankshaft of a prime mover in a desired angular position.

In general, the above analysis may be used to employ an alternator as a cranking motor to "bar over", or rotate, a crankshaft of a prime mover in a vehicle to a desired position to, for example, facilitate maintenance of the prime mover. A method for doing this is shown in FIG. 5.

The method begins with no current flowing in either field coil 26 or stator coils 28A, 28B, or 28C. At 502, the initial position of rotor 22 is determined using, for example, a position signal from sensor 49. Then at 504 a direction of torque is determined which is required to be produced on rotor 22 to rotate the rotor from the initial position to a displacement position corresponding to the desired crankshaft position. Current in field coil 26 is then increased at 506 to an initial value of, for example, a substantial fraction of full field current. A value of starting torque required to overcome friction and inertia of alternator 20 and engine 24 is then received, or otherwise determined, at 508. For example, this value could be determined experimentally for the particular alternator-engine combination.

Using the analysis set forth above, the steady-state amplitudes of three-phase currents in the stator coils required to produce magnetic flux sufficient to generate the starting torque value are then calculated at 510 and supplied at 512 to stator coils 28A, 28B, and 28C, such that the phase direct axis of the stator coils is aligned with the initial rotor position. Next, at 514, the amplitudes of currents in the stator coils are modified while maintaining constant their phase relationship, so as to rotate the phase direct axis toward the desired position. That is, a frequency w of three-phase current is supplied to the stator coils. This in turn generates torque in rotor 22 sufficient to overcome friction and inertia and slowly rotate rotor 22 and connected crankshaft 23 toward the desired position.

At 516, sensor 49 generates a signal representing the angular position of the rotor. Using this signal, computer 46 determines when rotor 22 has reached the desired position and then ceases supply of current in stator coils stator coils 28A, 28B, and 28C at 518.

The present invention may thus enable detection of many types of faults not generally known to a cranking system, allow mechanics to spot the engine at any desired crankshaft angle, and provide a cylinder compression diagnostic capability not possible with conventional cranking systems.

It will be apparent to those skilled in the art that various modifications and variations can be made to the disclosed system. Other embodiments will be apparent to those skilled in the art from consideration of the specification and practice of the disclosed system. It is intended that the specification and examples be considered as exemplary only, with a true scope being indicated by the following claims and their equivalents. Further, it should be understood that, as used herein, the indefinite articles "a" and "an" mean "one or more" in open-ended claims containing the transitional phrase "comprising," "including," and/or "having."

What is claimed is:

1. A method for placing a crankshaft of a prime mover in a desired angular position, the crankshaft being coupled to a rotor of an electrical machine, the electrical machine having a field coil and a plurality of stator phase coils, the method comprising:

determining an initial position of a rotor of the electrical machine with no current flowing;

determining the direction of the torque to be produced on the rotor when the rotor is rotated from the initial position to a displacement position corresponding to the desired crankshaft position;

increasing current in the field coil to an initial value;

receiving a value of torque required to begin rotation of the electrical machine;

calculating the amplitudes of phase currents in the stator phase coils required to produce the received torque value;

supplying the calculated phase currents to the stator phase coils, such that a phase direct axis of the stator phase coils is aligned with the initial rotor position;

modifying the amplitudes of phase currents in the stator phase coils so as to rotate the phase direct axis toward the displacement position;

generating a signal representing the angular position of the rotor; and ceasing supply of current to the stator phase coils when the position signal indicates that the rotor is in the displacement position.

2. A method as recited in claim 1 wherein calculating comprises calculating the amplitudes of phase currents in the stator phase coils required to produce the received torque value using the equation $T=K\, l_a\, l_{fd}\, \sin(\delta_{sr})$, where K is a cranking motor machine constant, $l_a$ is a phase current, $l_{fd}$ is a field current, and $\delta_{sr}$ is a relative angular position of a stator magnetic axis S and a rotor position r.

3. Apparatus for placing a crankshaft of a prime mover of a vehicle traction system in a desired angular position, comprising:

an alternator for supplying electrical energy to the traction system when driven by the prime mover;

the alternator comprising a rotor coupled to a crankshaft of the prime mover, a field coil on the rotor, and a plurality of stator phase coils;

a sensor generating a position signal representing an angular position of the rotor;

a processor; and a memory storing instructions which, when executed by the processor, cause the apparatus to:

determine an initial position of a rotor of the alternator with no current flowing in the field coil or the stator phase coils, based on the position signal;

determine a direction of torque to be produced on the rotor when the rotor is rotated from the initial position to a displacement position corresponding to the desired position;

increase current in the field coil to an initial value;

receive a value of torque required to begin rotation of the alternator and the crankshaft;

calculate the amplitudes of phase currents in the stator phase coils required to produce the received torque value;

supply the calculated phase currents to the stator phase coils, such that a phase direct axis of the stator phase coils is aligned with the initial rotor position;

modify the amplitudes of phase currents in the stator phase coils so as to rotate the phase direct axis toward the displacement position; and cease supplying current to the stator phase coils when the position signal indicates that the rotor is in the displacement position.

4. Apparatus as recited in claim 3, wherein the memory stores instructions which when executed by the processor cause the apparatus comprises calculate the amplitudes of phase currents in the stator phase coils required to produce the received torque value using the equation $T=K\, l_a\, l_{fd}\, \sin(\delta_{sr})$, where K is a cranking motor machine constant, $l_a$ is a phase current, $l_{fd}$ is a field current, and $\delta_{sr}$ is a relative angular position of a stator magnetic axis S and a rotor position r.

* * * * *

UNITED STATES PATENT AND TRADEMARK OFFICE
CERTIFICATE OF CORRECTION

PATENT NO. : 9,000,709 B2  Page 1 of 1
APPLICATION NO. : 13/612209
DATED : April 7, 2015
INVENTOR(S) : Brian T. Concannon It is certified that error appears in the above-identified patent and that said Letters Patent is hereby corrected as shown below:

Title Page, Item 73 (Assignee), line 1, delete "LeGrange," and insert -- LaGrange, --.

In the Specification

Column 5, line 59, delete "Industrial Applicability" and insert -- INDUSTRIAL APPLICABILITY --.

Signed and Sealed this
Fifteenth Day of March, 2016

Michelle K. Lee
*Director of the United States Patent and Trademark Office*